Aug. 9, 1927.
K. C. D. HICKMAN
1,638,577
ROLL FILM CARTRIDGE
Filed Nov. 4, 1926
2 Sheets-Sheet 1
FIG_1_
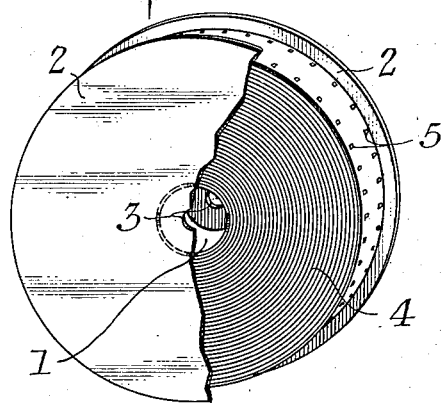
FIG_2_
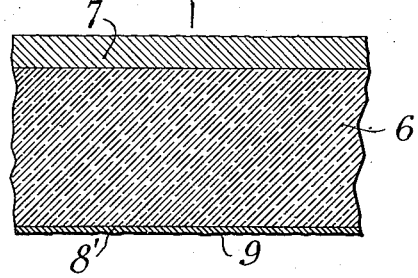
FIG_3_
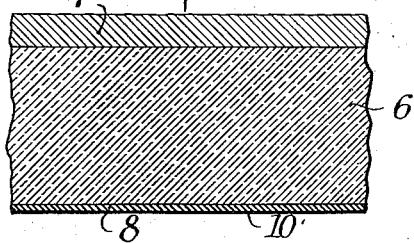
FIG_4_
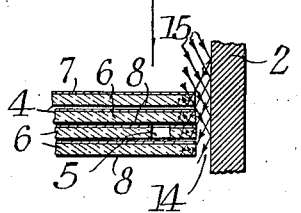
FIG_5_
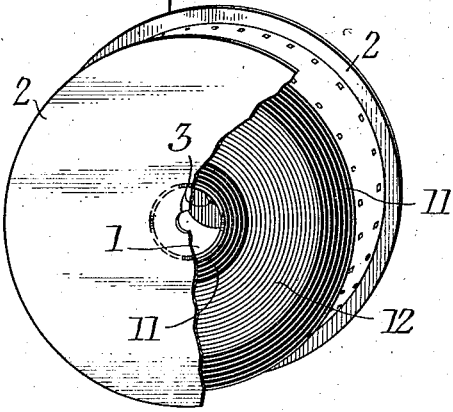
FIG_6_
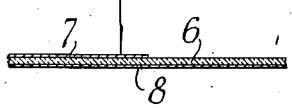
FIG_7_
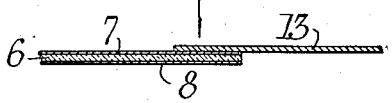
INVENTOR,
Kenneth C.D. Hickman,
BY
ATTORNEYS.

Aug. 9, 1927.  K. C. D. HICKMAN  1,638,577
ROLL FILM CARTRIDGE
Filed Nov. 4, 1926   2 Sheets-Sheet 2
FIG_9_
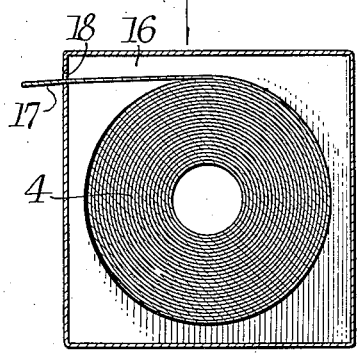
FIG_10_
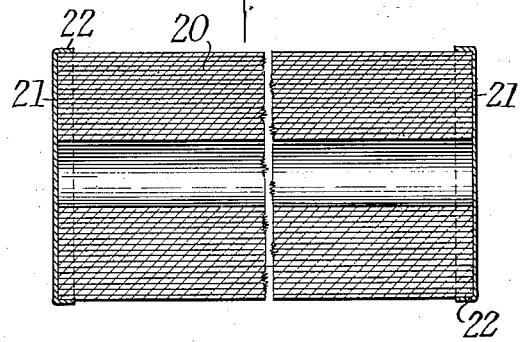
FIG_8_
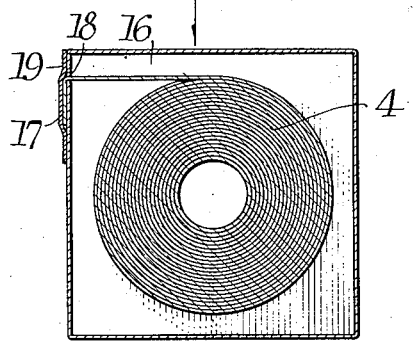
FIG_11_
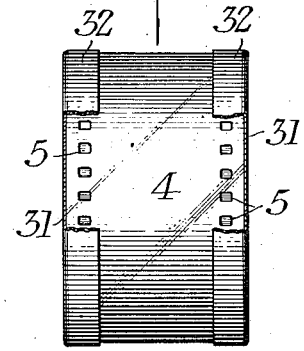
INVENTOR,
Kenneth C.D.Hickman,
BY
ATTORNEYS.

Patented Aug. 9, 1927.

1,638,577

UNITED STATES PATENT OFFICE.

KENNETH C. D. HICKMAN, OF ROCHESTER, NEW YORK, ASSIGNOR TO EASTMAN KODAK COMPANY, OF ROCHESTER, NEW YORK, A CORPORATION OF NEW YORK.

ROLL FILM CARTRIDGE.

Application filed November 4, 1926. Serial No. 146,251.

This invention relates to daylight loading roll film cartridges and particularly to cartridges of this type intended for use with motion picture cameras.

Various problems have arisen in connection with the use of such cartridges in photographic apparatus and especially in cinematographic cameras. Many types have been introduced and are in use, but none of these overcomes all of these difficulties and embodies all of the advantages that are desirable.

In portable, spring driven, motion picture cameras, there are used perforated films which are alternately held at and advanced past a gate, against which they have a certain tendency to stick. Since it is desirable that the spring shall be as light as possible, it is essential that the load on it shall be as small and as uniform as possible. It is, therefore, particularly important that the film band shall proceed with the least possible friction and use of power. When separate leader bands are used, the juction of these with the sensitized strips constitute thick points that tend to catch. Moreover, such leaders, if of paper, are of a different order of resilience than the cellulosic film and sometimes do not maintain the necessary self-supporting loops in the camera; they have also usually a different surface that does not slide through the gate as readily as does the film, so that if the tension at the gate is adjusted for proper operation with the sensitized film portion, it is sometimes not right for the leader strips. They differ from film, moreover, in their expansion characteristics due to changes in atmospheric conditions, and paper strips that have been cut within the necessary manufacturing tolerances may sometimes swell and bind between the flanges more than is desirable, particularly in a spring driven camera. The manufacture and attachment of these separate strips necessitate many manufacturing operations.

When attempts have been made to use leader strips of proxylin or other light cellulosic compositions, these have sometimes been found not to afford as good protection against light as did the paper, particularly against the fault known as edge fog, due to light leaking down between the edges of the convolutions and the spool flanges. Paper, being more flexible, has a tendency to weave from side to side and some of the convolutions would usually light lock one edge while others would seal the other edge, whereas the stiffer cellulosic strip would tend to run with the convolutions more nearly in line. Since manufacturing tolerances must necessarily be made between the width of the band and the distance between the flanges, there would frequently result a visible crack leading down along one flange and constituting a grave source of trouble from light leak.

Another source of trouble in all photographic work is halation, that is, the reflection of rays back from the rear surface of the support upon the rear surface of the emulsion layer.

I have found that all of the above difficulties can be overcome and certain additional advantages attained by eliminating entirely the use of lead strips distinguishably separate from the sensitive film itself, by dyeing the rear surface of the transparent cellulosic support with a dye which is absorptive of light of the wave length to which the emulsion is sensitive, which is dissolved in or which is destroyed by the photographic baths to which the film is submitted, but which do not deleteriously affect such baths or the developing apparatus, and then preferably submitting the dyed surface to a buffing operation that consolidates the dye layer and renders it of uniform smoothness and thickness.

It is to be borne in mind that the emulsions with which I particularly contemplate the use of my invention are fast, that is, intended for taking the original exposures as snapshots and at the speed usual in motion picture cameras, as distinguished from a slower printing emulsion. Such a film would have a speed greater than 50 H. and D. It would, in general, therefore be undesirable to incorporate the dye in or apply it to the sensitive emulsion where it would have a screening action, lengthening the necessary exposure time.

Motion picture film is now largely processed in continuous automatic machines through which the film passes. It is, therefore, not desirable to have the dye in a colloid or other carrier layer which, while soluble, would tend first to become gummy and then to come off on the rolls and sprockets of the machine. The dye must not penetrate the cellulosic support, which is rather impervious to photographic baths, to such an extent that the baths cannot act upon it in the short time required to pass through such machines and it must, moreover, be a dye which is quickly acted on by the particular baths used. At present, a large amount of film is processed by a reversal method and the original film is used for projection purposes. It is, therefore, important with such film that the dye shall be completely and uniformly eliminated from the film.

While my preferred embodiment relates to a fast film having no distinguishable leader strips and intended particularly for use in a motion picture camera and to be submitted to a reversal process, it is obvious that other embodiments attaining some, at least, of the advantages of my preferred form are possible and I contemplate them as included in my invention.

My preferred embodiment and certain other forms of my invention will now be fully described, reference being made to the accompanying drawing in which the same reference characters denote the same parts throughout and in which:

Fig. 1 is a perspective view of a preferred form of cartridge in which my invention is embodied.

Fig. 2 is a section of the film, on a highly magnified scale prior to buffing.

Fig. 3 is a similar section after buffing.

Fig. 4 is a diagram partially illustrating the effect of the dye.

Fig. 5 is a perspective view of another form of cartridge embodying my invention.

Figs. 6 and 7 are sections, on an enlarged scale, of the film band disclosed in Fig. 4, showing two forms of the junction of the sensitized and unsensitized portions.

Figs. 8 and 9 are sections of another form of cartridge embodying my invention showing it respectively as sold and as in use.

Fig. 10 is a longitudinal section of still another form of cartridge embodying my invention.

Fig. 11 is a view of another cartridge with fragments broken away.

In Fig. 1, is shown a typical form of film cartridge to which my invention is applied. This comprises a reel having an annular core 1 and parallel side flanges 2 which are imperforate except for the axial apertures 3. Upon this is wound a film band 4, which fits between the flanges with the usual manufacturing tolerances.

This film band, in the preferred form of my invention, is of uniform width and constitution throughout its length, having no definitely defined and clearly distinguishable protective or leader strips at its ends. In an embodiment designed particularly for use in small portable cameras, it would be of narrow width, say 16 mm., and have one pair of perforations 5 for each picture area, and the base or supporting layer 6 would be of a transparent cellulose acetate composition; though, of course, it may be of any plastic cellulosic material, comprising a cellulose ester or ether, viscose or the like.

Upon one surface of this supporting layer 6 is a photographically sensitive layer 7. For the purposes which I have described, this would ordinarily be a gelatino-silver-halide emulsion of sufficient speed for use in making camera exposures in the limited time necessary in ordinary motion picture work and under the usual working, lighting and exposure conditions.

Upon the other face of the support is a coating of dye 8, which is preferably applied before the sensitive coating but may be applied after. This may be applied in any of the usual ways, as by brushing, passing the films over rollers or wicks, floating it over a dye bath, or the like.

A dye bath having the characteristics mentioned, when used with an emulsion such as is now on the market for motion pictures to be exposed by amateurs and treated by the reversal process described in the patent, Capstaff, 1,460,703, granted July 3, 1923, is the following:

| | Parts by weight. |
|---|---|
| Magenta | 2 |
| Alcohol soluble aurine | 7 |
| Methyl alcohol | 100 |

In the above formula, safranine G may be used in place of magenta.

After application, the dye coating is dried without heat and may be buffed. This last step is not always necessary. It is particularly desirable if the dye coating is heavy.

This buffing process comprises preferably moving the dyed surface of the film past the peripheral surface of rotating felt or cloth discs, such as are used in nickel plating. In practice, I have found that with the film moving 5 or 6 inches a second, the peripheral speed in the opposite direction of the contacting disc surface may be 3000 to 7000 feet a second. The effect of this operation is illustrated in Figs. 2 and 3, which are drawn to scale from photomicrographs. The dye layer 8' has originally an irregular thickness of the order of .04 mm. and its surface is slightly rough as shown at 9. This roughness may be so great as to introduce an undesirable amount of friction between the film and the gate. The buffing operation consolidates and hardens this layer with not more than a slight diminution in thicknesses where the buffing is carried on only long enough to consolidate and smooth the surface without abrading it. This buffed layer 8 has a smooth, hard surface 10 which passes through the gate with very litle friction. The buffing also renders the dye layer more difficultly removable by scratching, though it can be scratched off with a stylus. Because of this characteristic, it is possible in a suitably constructed camera to scratch off a part of the dye to form a legend which may be light printed through the back of the film by subdued light. The penetration of the dye into the support is very slight being imperceptible at a magnification of five hundred diameters under the conditions given in the preferred example.

It is not removed by water alone, and may not be by ordinary photographic developing baths alone. It is, however, completely removed by submission first to the developing bath and then to the bleaching bath described in the Capstaff patent mentioned.

A dye bath suitable for use with a panchromatic emulsion is the following:

| | Parts by weight |
|---|---|
| Magenta | 1 |
| Aurine | 5 to 7 |
| Naphthalene green | 2 to 5 |
| Alcohols | 100 |

The alcohols herein referred to comprise 0 to 100 parts of methyl alcohol and 100 to 0 parts of ethyl alcohol.

This will be completely removed from the support in a developing bath, but is not substantially affected by water alone.

In general, there may be used any dye in the class defined by having the properties of absorbing actinic light, of being readily dissolved or destroyed in ordinary photographic baths and of not injuriously affecting such baths. Some, among many possible dyes, are safranine G, safranine O, ponceau 2R, crocine, spirit soluble nigrosine, metanil yellow.

When I state that the dye layer is not soluble or removable in water alone, I mean that it is so little affected that no visible change is apparent. While this feature is useful, in that the dye will not run if the camera is loaded for instance by a person with moist fingers or in a very humid atmosphere, it is not essential to certain aspects of my invention. Moreover, certain of the dyes specified have, alone, some solubility in water, but when combined with other dyes and applied without a colloid binder to the film, the resulting layer is not soluble.

Careful experiment has failed to show that the enumerated dyes have any injurious effect upon any of the ordinary photographic baths.

All of the dyes mentioned are well known and their physical and chemical properties and structures may be found in the usual encyclopædias or catalogs of dyes.

The particular dye or dyes to be used in any specific instance would be determined by the light sensitivity of the emulsion and the effect with the photographic baths with which the emulsion was intended for use.

In Fig. 4 is illustrated diagrammatically the effect of the dye. There is unavoidably present a space 14 between the flange 2, a fragment of which is shown, and the edges of the coiled film band 4, and rays 15 of light penetrating this space impinge the edges of the film. Some of them enter the transparent layer 6 at its edge and proceed by internal reflection through the film. If the film were undyed, as has been customarily the case, this light entering at the edges would affect the sensitive material and produce light fog. Since each convolution of material has a dye layer that absorbs actinic light, this will absorb both the light which might tend to pass through it and that which would tend to be internally reflected, and in any event will positively prevent any dangerous amount of light penetrating beyond the line of the perforations, one of which appears at 5.

It is to be understood that in general, a single dye layer is not opaque nor sufficiently absorptive to stop all dangerous rays, but a very few layers are sufficient. Some light will also penetrate through the perforations 5 for a few of the outside layers but not sufficiently to fog a longer length than is now commonly used for paper protective strips. This film may be processed in the usual way, a certain length at each end corresponding to the present lead strip being cut off, it being understood by the user that the ends are the equivalent of lead strips. They may be purposely or accidentally light fogged or marked in any way by the manufacturer or user.

As has been noted the penetration of the dye is extremely slight. If it is desired to increase this, there may be added to the dye bath a small amount, (say 1 part in the formulæ given) of a true base solvent with or without some base material dissolved in it; such, for instance, as acetone with cellulose acetate dissolved in it. I do not, however, generally find this necessary or desirable. The penetration in any event should not be so great that the dye will not be completely removed by the photographic baths.

If the proportion of dye in the baths as given is increased, I find that the amount remaining on the film is decreased rather than increased as would be expected.

If for any reason, it is necessary to open the camera when a roll of film is partly exposed, only the loop of film that is in passage from one reel to the other and a very short amount on the reels will be spoiled. The amount so lost will be very much less than with the undyed films now customarily used.

My invention, in certain of its aspects, may be employed in film bands having distinguishable protective or lead strips, as shown in Fig. 5, where the protective portions are designated 11, and the sensitive portion 12. This protective extension may be constituted by the omission, for the sake of economy, of the sensitive emulsion as in Fig. 6. The sensitive emulsion 7 is here shown as terminating and the support 6, with its dye 8 is continued. In Fig. 7, the support 6 with the emulsion 7 and dye 8 is discontinued and the protective portion is a entirely separate strip 13, which may be of paper cemented thereto.

Another type of cartridge embodying my invention is illustrated in Figs. 8 and 9. This comprises a box or casing 16, in which is a coil of my improved film 4 of uniform width and constitution throughout its length, and without a core, spool or reel. The magazine has an opening 18 sufficiently wide so that the film strip can pass through it readily. As furnished by the manufacturer, one end of the film will extend through the opening 18 and be held down at 17 against the outside of the box by a sealing strip 19, which will also completely cover the opening 18. This magazine is intended to be placed bodily in a suitable camera, the sealing strip torn off and the film threaded through the camera. The opening 18 will be without a light trap during such threading and during the operation of the camera. If ordinary film were used, such a magazine could be loaded only in a dark room, but with film embodying my invention, the amount of light entering through the opening 18, if the camera is threaded with reasonable care in the shade or in subdued light, will not cause objectionable light fog.

The cartridge shown in Fig. 10 consists of a length of film 20 embodying my invention coiled upon itself and held in place only by imperforate, removable end caps 21 having flanges 22 encircling the edges of the coil of film. It is to be understood that the number of convolutions would be much greater than as shown. Such a cartridge would be made in rather large sizes for use in cameras taking roll films and particularly in commercial copying cameras where the required sensitivity is low and where cartridges would be loaded in subdued light or by artificial light and where a wider margin could be fogged than is permissible on motion picture films. The caps would be removed and the coils placed in magazines in the camera and the lead end of the film pulled out and drawn past the exposure field in the usual way.

In Fig. 11, a somewhat analogous form is shown, the coil of film 4 having caps with imperforate ends 31 and flanges 32 extending beyond the perforations 5 in the film.

When a roll has been used, it is obvious that the part which had been coiled tightly on the inside of the coil becomes, after use, the protective part coiled around the outside of the rewound film. If this part is of cellulosic material, it will have acquired a certain "set" by which it tends to hold its coiled shape and to embrace or clasp the coiled film within, whereas a paper strip does not have this capacity of holding its shape, but rather tends to unroll after use.

I have also found in practice that, partly because the film is self protective throughout, the amount of film actually required for protective use is substantially less than is necessary when paper strips are used.

The use of printed, cautionary and advisory legends on the end portions are also less necessary since the user will have an incentive to expose as little of the end portion as possible in order to utilize as much of the sensitized film as he can, if he is to get the benefit of the exposed portion thus gained. Of course, the manufacturer, for the sake of uniformity in processing and for other reasons may so mark or fog the end portions that the customer will receive only a predetermined standardized length.

It is obvious that numerous other embodiments of my invention are possible and I contemplate as within my invention all such modifications and equivalents as fall within the scope of the appended claims.

Having thus described my invention, what I claim and desire to secure by Letters Patent is:

1. A daylight loading cartridge of photographic film including a coiled film band, said film band comprising a support of light transmitting cellulosic material carrying upon one surface a sensitive photographic layer and directly upon the other surface a dye layer having the characteristics that it absorbs actinic light, is insoluble in water and is removable from the support by photographic baths.

2. As an article of manufacture, a roll of photographic film including a coiled film band, said band comprising a support composed of a transparent, plastic, cellulosic compound, a photographically sensitive layer upon one surface of the support and a dye coated directly upon the other surface and having the characteristics that it absorbs actinic light, is insoluble in water and is removable from the support by photographic baths.

3. A daylight loading cartridge of photographic film including a coiled film band, said band comprising a support of light transmitting cellulosic material, a photographically sensitive layer having a speed greater than 50 H. and D. on one surface of the support and dye coated directly over the entire other surface and having the characteristics that it is absorptive of light of all wave lengths to which the emulsion is sensitive and that it will be removed from the support by the ordinary baths of a photographic process.

4. A daylight loading cartridge of motion picture film including a coiled film band, said band comprising a support of transparent cellulosic material having upon one surface a photographic emulsion having speed greater than 50 H. and D. and having directly upon the other surface a dye layer having the characteristics that it is insoluble in water, is entirely removable from the support by the baths of a photographic reversal process, that it is absorptive of light of all wave lengths to which the emulsion is sensitive and that it does not effect the photographic baths deleteriously, the dyed layer being consolidated and highly polished.

5. A daylight loading cartridge of motion picture film including a coiled film band, said band being of uniform width and constitution throughout its length, and comprising a support of transparent cellulosic material, a photographic emulsion extending entirely over one surface of said support and having a speed greater than 50 H. and D. and dye adherent in the form of a layer directly to the other surface and extending entirely over said surface, said dye having the characteristics that it is insoluble in water, is entirely removable from the support by the baths of a photographic reversal process, that it is absorptive of light of all wave lengths to which the emulsion is sensitive, and that it does not deleteriously affect the photographic baths, the dye layer being consolidated and highly polished.

6. A daylight loading cartridge of photographic film including a coiled film band, said film band comprising a support of flexible light transmitting material, a photographically sensitive layer upon one surface of the support, and dye coated directly upon the entire other surface, and having the characteristics that it is absorptive of actinic light and that it is entirely removable from the support by the ordinary baths of a photographic process, the penetration of the dye into the support being no greater than the penetration of such baths.

7. As an article of manufacture, a roll of photographic film including a coiled film band, said band comprising a support composed of a flexible, transparent, plastic, cellulosic compound, a photographically sensitive layer upon one surface of the support and dye coated directly upon the entire other surface, and having the characteristics that it is absorptive of actinic light and that it is entirely removable from the support by the ordinary baths of a photographic process, the penetration of the dye into the support being no greater than the penetration of such baths.

8. A daylight loading cartridge of photographic film comprising a reel with side flanges and a film band wound thereon, said film band comprising a support of flexible light transmitting material carrying upon one surface a sensitive photographic layer and, directly upon the other surface, dye having the characteristics that it absorbs actinic light and is removable from the support by photographic baths.

9. A daylight loading cartridge of photographic film comprising a reel with side flanges and a band wound thereon, said band comprising a support of cellulosic material, a sensitive photographic layer upon one surface, and dye coated directly upon the other surface thereof, said dye having the characteristics that it is absorptive of light of wave lengths to which the emulsion is sensitive and that it is entirely removable from the support by the ordinary baths of a photographic process, the penetration of the dye into the support being no greater than the penetration of such baths.

10. A daylight loading cartridge of photographic film comprising a reel with side flanges and a band wound thereon, said band comprising a support of flexible, light transmitting material, a photographic layer, having a speed greater than 50 H. and D., on one surface of the support, and dye coated uniformly directly upon the other surface, said dye having the characteristics that it is absorptive of light of all wave lengths to which the emulsion is sensitive and that it will be removed from the support by the ordinary baths of a photographic reversal process, the penetration of the dye into the support being no greater than the penetration of such baths.

11. A daylight loading cartridge of photographic film comprising a reel with side flanges and a band wound thereon, said band being of uniform width and constitution throughout its length and comprising a support of cellulosic material, a sensitive layer, and a uniform dye coating, said dye coating having the characteristics that it absorbs actinic rays and is entirely removable from the band in photographic baths.

12. A daylight loading cartridge of photographic film comprising a reel with side flanges and a band wound thereon, said band being of uniform width and constitution throughout its length and comprising a support of cellulosic material, a sensitive photographic layer upon one surface thereof and a dye carried on the other surface, the dye having the characteristics that it is absorptive of actinic light of wave lengths to which the layer is predominantly sensitive and that it is entirely removable from the support by the baths of a photographic reversal process.

13. A daylight loading cartridge of motion picture film comprising a reel with side flanges and a band of uniform width and constitution throughout its length wound in a coil between the flanges, said film band comprising a support of transparent cellulosic material having upon one surface a photographic emulsion having a speed greater than 50 H. and D., and having, directly upon the other surface, dye having the characteristics that it will be removed from the support by the baths of a photographic reversal process, that it is absorptive of light of all wave lengths to which the emulsion is sensitive and that it does not affect the photographic baths deleteriously, the penetration of the dye being no greater than that of such baths.

14. A daylight loading cartridge of photographic film comprising a reel with side flanges and a film band wound thereon, said film band comprising a support of flexible, light-transmitting material carrying upon one surface a sensitive photographic layer and directly upon the other surface a dye having the characteristics that it absorbs actinic light and is removable from the support by photographic baths, the dyed surface being highly polished and consolidated.

15. A daylight loading cartridge of photographic film comprising a reel with side flanges and a band wound thereon, said band comprising a support of light transmitting cellulosic material, a photographic layer, having a speed greater than 50 H. and D., on one surface of the support and dye coated uniformly directly upon the other surface, said dye having the characteristics that it is absorptive of light of all wave lengths to which the emulsion is sensitive, that it will be removed from the support by the ordinary baths of a photographic reversal process, and that it penetrates the support no more than such baths, the dyed surface being highly polished.

16. A daylight loading cartridge of photographic film comprising a reel with side flanges and a band wound thereon, said band being of uniform width and constitution throughout its length and comprising a support of cellulosic material, a sensitive layer, and a uniform dye coating, said dye coating having the characteristics that it absorbs actinic rays and is entirely removable from the band in photographic baths, the dye coating being highly polished and consolidated.

17. A daylight loading cartridge of motion picture film comprising a reel with side flanges and a band of uniform width and constitution throughout its length wound in a coil between the flanges, said film band comprising a support of transparent cellulosic material having upon one surface a photographic emulsion having a speed greater than 50 H. and D., and having directly upon the other surface, a dye having the characteristics that it will be removed from the support by the baths of a photographic reversal process, that it is absorptive of light of all wave lengths to which the emulsion is sensitive, that it does not affect the photographic baths deleteriously, and that it penetrates the support no more than do the baths, the dyed surface being highly polished.

18. A daylight loading cartridge of motion picture film comprising a reel with side flanges and a band of uniform width and construction throughout its length wound in a coil between the flanges, said film band comprising a support of transparent cellulosic material having upon its front side a layer of photographic emulsion having a speed greater than 50 H. and D. and carrying a dye layer positioned behind the emulsion layer and having the characteristics that it is insoluble in water, that it is absorptive of light of all wave lengths to which the emulsion is sensitive, and that it is completely removable in the baths of a photographic reversal process.

Signed at Rochester, New York this 29th day of October, 1926.

KENNETH C. D. HICKMAN.